United States Patent
Jo

(10) Patent No.: US 9,791,671 B2
(45) Date of Patent: Oct. 17, 2017

(54) OPTICAL SYSTEM

(71) Applicant: SAMSUNG ELECTRO-MECHANICS CO., LTD., Suwon-si (KR)

(72) Inventor: Yong Joo Jo, Suwon-si (KR)

(73) Assignee: Samsung Electo-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/926,261

(22) Filed: Oct. 29, 2015

(65) Prior Publication Data

US 2016/0154211 A1 Jun. 2, 2016

(30) Foreign Application Priority Data

Nov. 28, 2014 (KR) .......................... 10-2014-0168478

(51) Int. Cl.
| | |
|---|---|
| *G02B 13/18* | (2006.01) |
| *G02B 3/02* | (2006.01) |
| *G02B 13/00* | (2006.01) |
| *G02B 9/62* | (2006.01) |
| *G02B 27/00* | (2006.01) |

(52) U.S. Cl.
CPC ............ *G02B 13/0045* (2013.01); *G02B 9/62* (2013.01); *G02B 27/0025* (2013.01)

(58) Field of Classification Search
CPC ... G02B 13/0045; G02B 27/0025; G02B 9/62
See application file for complete search history.

(56) References Cited

U.S. PATENT DOCUMENTS

| | | | |
|---|---|---|---|
| 9,217,848 B1 * | 12/2015 | Chen ................ | G02B 13/0045 |
| 2013/0235473 A1 | 9/2013 | Chen et al. | |
| 2014/0009844 A1 | 1/2014 | Tsai et al. | |
| 2015/0212296 A1 * | 7/2015 | Huang ............... | G02B 13/0045 |
| | | | 348/335 |

FOREIGN PATENT DOCUMENTS

| | | |
|---|---|---|
| KR | 10-0962970 B1 | 6/2010 |
| KR | 10-0962999 B1 | 6/2010 |

* cited by examiner

*Primary Examiner* — Alicia M Harrington
(74) *Attorney, Agent, or Firm* — NSIP Law

(57) ABSTRACT

There is provided an optical system including a first lens, a second lens, a third lens, a fourth lens including a negative refractive power, a fifth lens including negative power, and a sixth lens. An image-side surface of the fourth lens is convex in a paraxial region. An image-side surface of the fifth lens is convex in the paraxial region. The sixth lens includes an image-side surface that is concave in the paraxial region. The first to sixth lenses are sequentially disposed from an object side to an image side.

16 Claims, 16 Drawing Sheets

| Surface | Radius | Thickness | index | abbe |
|---|---|---|---|---|
| object | Infinity | Infinity | | |
| 1 | 2.61089 | 0.29254 | 1.64 | 23 |
| 2 | 2.39524 | 0.107307 | | |
| Stop | Infinity | 0 | | |
| 3 | 1.22509 | 0.249716 | 1.64 | 23 |
| 4 | 1.21385 | 0.116603 | | |
| 5 | 6.77112 | 0.664523 | 1.54 | 55 |
| 6 | -0.86673 | 0.132421 | | |
| 7 | -1.00234 | 0.372368 | 1.64 | 23 |
| 8 | -1.24397 | 0.05 | | |
| 9 | -1.02176 | 0.351056 | 1.64 | 23 |
| 10 | -1.82346 | 0.02 | | |
| 11 | 0.67008 | 0.35893 | 1.53 | 55 |
| 12 | 0.63764 | 0.5 | | |
| 13 | Infinity | 0.11 | 1.517 | 64.2 |
| 14 | Infinity | 0.732971 | | |
| Image | Infinity | 0 | | |

| Surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 3.759294 | -50.66781 | -23.985269 | -1.071717 | 0 | 0 | -1.956527 | -1.400631 | 0 | 0 | -2.011965 | -1.138388 |
| 4th Order Coefficient (A) | 0.0244885 | 0.393031 | -0.749323 | -0.106683 | -0.0982187 | 0.411602 | 0.059385 | -0.528103 | 0.934446 | 0.646079 | 0.274185 | -0.582618 |
| 6th Order Coefficient (B) | 0.387474 | 4.54731 | 26.1865 | -8.34266 | 1.04666 | 2.39701 | 3.37481 | 1.8617 | -0.86914 | 0.714809 | 0.113846 | 0.408039 |
| 8th Order Coefficient (C) | -2.56578 | 33.78841 | 413.258 | 103.87 | -9.67573 | 3.39046 | 16.2247 | -2.95586 | -0.188105 | 0.426447 | -0.0731742 | -0.207345 |
| 10th Order Coefficient (D) | 7.23327 | -126.688 | 3183.22 | -729.14 | 32.4682 | 38.3626 | -54.0335 | 1.86798 | 0.628787 | -0.138061 | 0.00248555 | 0.0716516 |
| 12th Order Coefficient (E) | -11.5807 | 212.156 | 13167.1 | 2711.823 | -42.5533 | 45.4368 | 77.0809 | -0.24513 | -0.356883 | 0.0246867 | 0.000142302 | -0.0138449 |
| 14th Order Coefficient (F) | 6.82559 | -128.732 | 27779 | -5042.19 | 19.9875 | -19.4482 | -53.4311 | -0.175102 | 0.0859613 | -0.00230642 | 4.17399E-06 | 0.00270798 |
| 16th Order Coefficient (G) | 0 | 0 | 33139.4 | 3607.18 | 0 | 0 | 14.4512 | 0.0497323 | -0.00773428 | 8.810846E-05 | -4.93160E-08 | -0.000014554 |
| 18th Order Coefficient (H) | 0 | 0 | 0 | 0 | 0 | 0 | 0 | 0 | 0 | 0 | 0 | 4.15828E-06 |

| Surface | Radius | Thickness | index | abbe |
|---|---|---|---|---|
| object | Infinity | Infinity | | |
| 1 | 2.62416 | 0.284744 | 1.64 | 23 |
| 2 | 2.16164 | 0.1 | | |
| Stop | Infinity | 0 | | |
| 3 | 1.15899 | 0.249913 | 1.64 | 23 |
| 4 | 1.22069 | 0.118632 | | |
| 5 | 6.51919 | 0.643086 | 1.544 | 55 |
| 6 | -0.88302 | 0.128906 | | |
| 7 | -1.06212 | 0.377325 | 1.64 | 23 |
| 8 | -1.28363 | 0.05 | | |
| 9 | -1.00613 | 0.351265 | 1.64 | 23 |
| 10 | -1.85772 | 0.034354 | | |
| 11 | 0.67869 | 0.365455 | 1.53 | 55 |
| 12 | 0.65208 | 0.5 | | |
| 13 | Infinity | 0.11 | 1.517 | 64.2 |
| 14 | Infinity | 0.733361 | | |
| Image | Infinity | 0 | | |

FIG. 7

| Surface # | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 3.905483 | -49.087292 | -23.019015 | -1.269565 | 0 | 0 | -2.938746 | -1.342948 | 0 | 0 | -2.128844 | -1.137197 |
| 4th Order Coefficient (A) | 0.8197504 | 0.452257 | -0.678022 | -0.176097 | -0.172326 | 0.358306 | -0.039147 | -0.340317 | 1.05748 | 0.650477 | -0.251093 | -0.368052 |
| 6th Order Coefficient (B) | 0.435177 | 5.17681 | 24.8092 | -6.50782 | 1.72538 | -2.43773 | 1.93192 | 1.96223 | 1.85666 | 0.696047 | 0.102536 | 0.39397 |
| 8th Order Coefficient (C) | -0.7866032 | 39.84208 | -3959.768 | 83.5702 | -13.3889 | 15.1377 | 17.58408 | -3.38034 | 0.0868408 | 0.386704 | -0.02066681 | -0.702564 |
| 10th Order Coefficient (D) | -0.213655 | -156.4193 | 3036.58 | -557.515 | 43.4733 | -42.904 | -54.797 | 2.52522 | 0.404811 | -0.121811 | 0.00214016 | 0.069463 |
| 12th Order Coefficient (E) | 1.17845 | 273.256 | -1284.21 | 2062.51 | -57.9223 | 51.6839 | 80.65931 | -4.257029 | -0.256802 | 0.0200862 | -0.003012884 | -0.215363 |
| 14th Order Coefficient (F) | -0.794631 | -174.035 | 26983 | -3763.88 | 27.0064 | -22.4209 | -57.4283 | 0.0152235 | 0.063252 | -0.00183931 | 3.874260-06 | 0.00201234 |
| 16th Order Coefficient (G) | 0 | 0 | -223382.5 | 3541.03 | 0 | 0 | 15.9087 | 0.0022679 | -0.00363896 | 6.70476e-05 | -3.85535E-08 | -0.000240224 |
| 18th Order Coefficient (H) | 0 | 0 | 0 | 0 | 0 | 0 | 0 | 0 | 0 | 0 | 0 | 3.98402E-06 |

FIG. 8

| Surface | Radius | Thickness | index | abbe |
|---|---|---|---|---|
| object | Infinity | Infinity | | |
| 1 | 2.68612 | 0.279488 | 1.64 | 23 |
| 2 | 2.09063 | 0.1 | | |
| Stop | Infinity | 0 | | |
| 3 | 1.1349 | 0.249316 | 1.64 | 23 |
| 4 | 1.22137 | 0.125318 | | |
| 5 | 6.14936 | 0.668065 | 1.544 | 55 |
| 6 | -0.88468 | 0.1 | | |
| 7 | -0.96978 | 0.332448 | 1.64 | 23 |
| 8 | -1.2124 | 0.233558 | | |
| 9 | -1.09462 | 0.350332 | 1.64 | 23 |
| 10 | -2.03196 | 0.02 | | |
| 11 | 0.70508 | 0.369179 | 1.53 | 55 |
| 12 | 0.67725 | 0.5 | | |
| 13 | Infinity | 0.11 | 1.517 | 64.2 |
| 14 | Infinity | 0.60918 | | |
| Image | Infinity | 0 | | |

FIG. 11

| Surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 3.336352 | -53.458019 | -23.318531 | -1.962965 | 0 | 0 | -2.165851 | -1.783733 | 0 | 0 | -2.087497 | -1.153336 |
| 4th Order Coefficient (A) | 0.032231B | 0.405275 | 0.762898 | 0.0119979 | 0.381235 | 0.024864 | 0.656981 | 0.592215 | 0.930946 | 0.533846 | 0.744459 | 0.502364 |
| 6th Order Coefficient (B) | 0.0962431 | -4.01858 | 13.9253 | -9.13082 | 1.449532 | 1.2269 | 3.82524 | 2.530068 | -1.096634 | -0.515534 | 0.0593022 | 0.327351 |
| 8th Order Coefficient (C) | -4.04311 | 775.343 | -231.544 | 163.576 | -18.5971 | 0.329539 | 4.88031 | -8.19208 | 0.676744 | 0.266741 | -0.0183442 | -0.153398 |
| 10th Order Coefficient (D) | 10.8509 | 96.5033 | 1713.28 | 636.766 | 31.1297 | 12.6795 | -2.67532 | 3.64511 | -0.333395 | -5.0766379 | 0.00191174 | 0.0486022 |
| 12th Order Coefficient (E) | -16.1926 | 151.535 | -6705.83 | 2158.02 | -36.66297 | 20.1353 | 24.66292 | -1.62375 | 0.123495 | 0.0123865 | -0.0201579948 | -0.0988524336 |
| 14th Order Coefficient (F) | 9.15677 | -86.2554 | 13775.5 | -3.668 | 14.7714 | -9.67466 | -22.943 | 0.355605 | -0.0276 | -0.001105884 | 3.1578E-06 | 0.00119176 |
| 16th Order Coefficient (G) | 0 | 0 | -10369.9 | 2415.3 | 0 | 0 | 6.74939 | -0.029756 | 0.00267033 | 3.72651E-08 | -3.725896E-08 | -7.719096E-05 |
| 18th Order Coefficient (H) | 0 | 0 | 0 | 0 | 0 | 0 | 0 | 0 | 0 | 0 | 0 | 2.0430E-06 |

FIG. 12

| Surface | Radius | Thickness | index | abbe |
|---|---|---|---|---|
| object | Infinity | Infinity | | |
| 1 | 2.57692 | 0.300264 | 1.64 | 23 |
| 2 | 2.40237 | 0.102815 | | |
| Stop | Infinity | 0 | | |
| 3 | 1.22634 | 0.24973 | 1.64 | 23 |
| 4 | 1.19897 | 0.117637 | | |
| 5 | 7.1081 | 0.680717 | 1.544 | 55 |
| 6 | -0.82902 | 0.1 | | |
| 7 | -0.88489 | 0.286216 | 1.64 | 23 |
| 8 | -1.1325 | 0.140028 | | |
| 9 | -0.99854 | 0.35014 | 1.64 | 23 |
| 10 | -1.6351 | 0.123645 | | |
| 11 | 0.77789 | 0.425694 | 1.53 | 55 |
| 12 | 0.7165 | 0.6 | | |
| 13 | Infinity | 0.11 | 1.517 | 64.2 |
| 14 | Infinity | 0.386209 | | |
| Image | Infinity | 0 | | |

FIG. 15

| surface# | 1 | 2 | 3 | 4 | 5 | 6 | 7 | 8 | 9 | 20 | 21 | 22 |
|---|---|---|---|---|---|---|---|---|---|---|---|---|
| Conic Constant (K) | 6.356726 | -32.943425 | -23.764967 | -1.570933 | 0 | 0 | -1.599494 | -2.074793 | 0 | 0 | -1.911145 | -1.145172 |
| 4th Order Coefficient (A) | 0.00367712 | 0.259324 | -0.179471 | 0.382035 | -0.219084 | 0.0496463 | -0.750403 | -0.573303 | 1.15798 | 0.616319 | -0.241345 | -0.434737 |
| 6th Order Coefficient (B) | 0.910866 | -1.52913 | 8.94427 | 5.54615 | 0.629357 | 1.04903 | 4.1393 | 2.67729 | 1.66306 | -0.773407 | 0.692831 | 0.25663 |
| 8th Order Coefficient (C) | -4.70839 | 9.49448 | -193.476 | 69.0275 | -6.89389 | 0.93575 | -4.26348 | -5.13563 | 1.14848 | 0.527698 | -0.0176481 | -0.106642 |
| 10th Order Coefficient (D) | 2.3266 | -33.8644 | 1646.77 | -475.912 | 20.8151 | -12.9926 | -13.0433 | 4.98613 | -0.50691 | -0.178376 | 0.00176467 | 0.03021751 |
| 12th Order Coefficient (E) | 18.5216 | 12.0177 | 7411.13 | 1796.04 | 23.8131 | 20.3159 | 35.3523 | 2.58022 | 0.241281 | 0.633752 | 9.81548E-05 | 0.00352289 |
| 14th Order Coefficient (F) | 9.49729 | -28.1065 | 1703 | -3298.83 | 9.26338 | -9.59873 | -30.9934 | 0.69375 | -0.023741 | -0.00380653 | 2.824546-06 | 0.000605608 |
| 16th Order Coefficient (G) | 0 | 0 | -15433 | 2303.72 | 0 | 0 | 9.49506 | -0.0770486 | 0.00188673 | 0.000131698 | -3.28744E-08 | 3.561876-05 |
| 18th Order Coefficient (H) | 0 | 0 | 0 | 0 | 0 | 0 | 0 | 0 | 0 | 0 | 0 | 8.58567E-07 |

FIG. 16

OPTICAL SYSTEM

CROSS-REFERENCE TO RELATED APPLICATION

This application claims the priority and benefit under 35 USC 119(a) of Korean Patent Application No. 10-2014-0168478 filed on Nov. 28, 2014, with the Korean Intellectual Property Office, the disclosure of which is incorporated herein by reference.

BACKGROUND

1. Field

The following description related to an optical system.

2. Description of Related Art

Mobile communications terminals normally include camera modules to capture images and record video calls. In addition, as levels of functionality of cameras in such mobile communications terminals have gradually increased, there is a demand for the camera modules in mobile communications terminals to have higher levels of resolution and performance.

However, because there is a trend for mobile communications terminals to be miniaturized and lightened, there are limitations in obtaining camera modules having high levels of resolution and high degrees of performance.

In order to address such issues, camera lenses in the camera modules have been formed of plastic, which is a material lighter than glass, and the number of camera lenses have been configured of five or more lenses to allow high levels of resolution to be realized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical system, including: a first lens; a second lens; a third lens; a fourth lens including a negative refractive power, wherein an image-side surface of the fourth lens is convex in a paraxial region; a fifth lens including a negative refractive power, wherein an image-side surface of the fifth lens is convex in the paraxial region; and a sixth lens including an image-side surface that is concave in the paraxial region, wherein the first to sixth lenses are sequentially disposed from an object side to an image side.

The optical system may also include a stop disposed between the first and second lenses, wherein, SD, a diameter of the stop and, f, an overall focal length of the optical system including the first to sixth lenses satisfy SD/f<0.5.

Where v1, an Abbe number of the first lens and, v2, an Abbe number of the second lens satisfy $|v1-v2|<10$.

In one example, r9, a radius of curvature of an object-side surface of the fifth lens and, r10, a radius of curvature of the image-side surface of the fifth lens satisfy $-0.5<(r9-r10)/(r9+r10)<0$.

The optical system may also include an image sensor configured to convert an image of a subject incident through the first through sixth lenses into electrical signals, wherein TTL is a distance from an object-side surface of the first lens to an image surface of the image sensor and f is an overall focal length of the optical system including the first to sixth lenses satisfying TTL/f<2.0.

In an example, f, an overall focal length of the optical system including the first to sixth lenses and, f1, a focal length of the first lens satisfy $0.01<|f/f1|<0.2$.

In one example, f, an overall focal length of the optical system including the first to sixth lenses and, f2, a focal length of the second lens satisfy $0.06<f/f2<0.2$.

In another example, f, an overall focal length of the optical system including the first to sixth lenses and, f3, a focal length of the third lens satisfy $1.3<f/f3<1.7$.

In a further example, f, an overall focal length of the optical system including the first to sixth lenses and, f4, a focal length of the fourth lens satisfy $0.07<|f/f4|<0.2$.

Further, f, an overall focal length of the optical system may include the first to sixth lenses and, f5, a focal length of the fifth lens satisfy $0.4<|f/f5|<0.7$.

Where, f, an overall focal length of the optical system including the first to sixth lenses and, f6, a focal length of the sixth lens satisfy $0.1<f/f6<0.4$.

In an example, f1, a focal length of the first lens and, f2, a focal length of the second lens satisfy $1.5<|f1/f2|<5.5$.

In another example, f4, a focal length of the fourth lens and, f5, a focal length of the fifth lens satisfy $2.0<f4/f5<8.0$.

In an example, v1, an Abbe number of the first lens and, v3, an Abbe number of the third lens satisfy $v3-v1>30$.

In an example, FOV, a field of view of the optical system satisfy FOV>85.

At least one inflection point may be formed on at least one of the first and second surfaces of the sixth lens, where the first surface of the sixth lens is convex in the paraxial region and becomes gradually concave towards an edge thereof, and the second surface of the sixth lens is concave in the paraxial region and becomes gradually convex towards an edge thereof.

In accordance with an embodiment, there is provided an optical system, including: a first lens including a negative refractive power; a second lens; a third lens; a fourth lens including a negative refractive power; a fifth lens including a negative refractive power and an image-side surface that is convex in a paraxial region; and a sixth lens including a refractive power and an image-side surface that is concave in the paraxial region, wherein the first to sixth lenses are sequentially disposed from an object side to an image side.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing respective characteristics of lenses in the optical system illustrated in FIG. 1;

FIG. 4 is a table representing respective aspherical surface coefficients of lenses in the optical system illustrated in FIG. 1;

FIG. 7 is a table representing respective characteristics of lenses in the optical system illustrated in FIG. 5;

FIG. 8 is a table representing respective aspherical surface coefficients of lenses in the optical system illustrated in FIG. 5;

FIG. 11 is a table representing respective characteristics of lenses in the optical system illustrated in FIG. 9;

FIG. 12 is a table representing respective aspherical surface coefficients of lenses in the optical system illustrated in FIG. 9;

FIG. 15 is a table representing respective characteristics of lenses in the optical system illustrated in FIG. 13; and FIG. 16 is a table representing respective aspherical surface coefficients of lenses of the optical system illustrated in FIG. 13.

Figure 1:
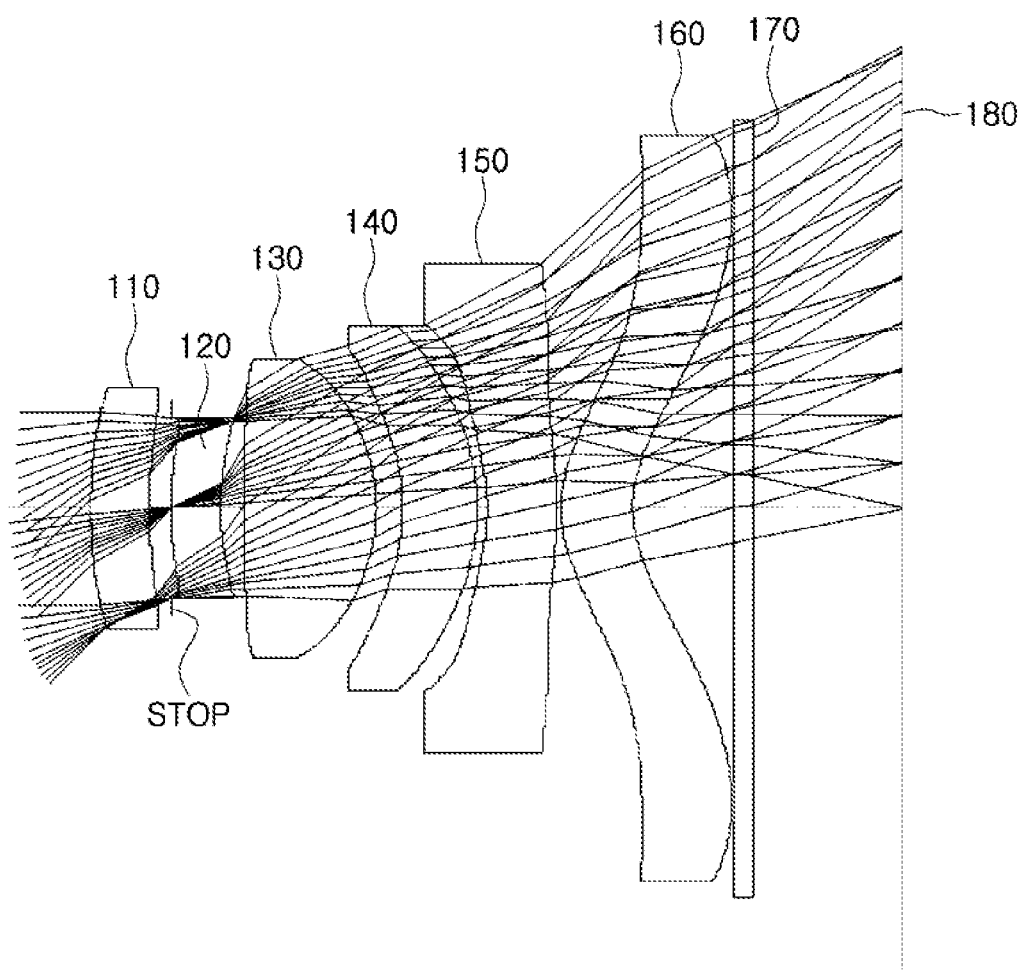
FIG. 1 is a view of an optical system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In addition, a first lens is a lens closest to an object, while a sixth lens is a lens closest to an image sensor.

In addition, a surface of each lens closest to an object is referred to as a first surface or an object-side surface, and a surface of each lens closest to an imaging surface is referred to as a second surface or an image-side surface. Further, all numerical values of radii of curvature, thicknesses, and other parameters of the lenses are represented in millimeters (mm).

Further, a paraxial region refers to a very narrow region in the vicinity of an optical axis. Paraxial region or space region near an axis is where the angle α between rays and optical axis is so small that sin α and tan a can be replaced with sufficient accuracy by the angle α.

In accordance with an illustrative example, the embodiments described of the optical system include six lenses. However, a person of ordinary skill in the relevant art will appreciate that the number of lenses in the optical system may vary, for example, between two to five lenses, while achieving the various results and benefits described hereinbelow.

In one example, the optical system includes a first lens, a second lens, a third lens, a fourth lens, a fifth lens, and a sixth lens.

However, the optical system is not limited to including six lenses, and may further include other components, if necessary. For example, the optical system may further include a stop to control an amount of light. In addition, the optical system may further include an infrared cut-off filter filtering infrared light. Further, the optical system may further include an image sensor converting an image of a subject incident on the image sensor into electrical signals. Further, the optical system may further include a gap maintaining member to adjust gaps between lenses.

In the optical system, according to embodiments, the first to sixth lenses are formed of materials including glass, plastic or other similar types of polycarbonate materials. In another embodiment, at least one of the first through sixth lenses is formed of a material different from the materials forming the other first through sixth lenses.

In addition, at least one of the first to sixth lenses may have an aspherical object-side or image-side surface. Further, each of the first to sixth lenses may have at least one aspherical object-side or image-side surface.

That is, at least one of first and second surfaces of the first to sixth lenses may be aspherical. In one example, the aspherical surfaces of the first to sixth lenses may be represented by the following Equation 1:

$$Z = \frac{cY^2}{1 + \sqrt{1 - (1+K)c^2 Y^2}} + AY^4 + BY^6 + CY^8 + DY^{10} + EY^{12} + FY^{14} + \ldots \quad \text{[Equation 1]}$$

In this equation, c is curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients. In addition, Z is a distance between the certain point on the aspherical surface at the distance Y and a tangential plane meeting the apex of the aspherical surface of the lens.

Each of the first through sixth lenses has a refractive power, either negative or positive. For instance, in one configuration, from the object side towards the image side, the first lens has a positive refractive power, the second lens has a positive refractive power, the third lens has a negative refractive power, the fourth lens has a positive refractive power, the fifth lens has a negative refractive power, and the sixth lens has a negative refractive power. Persons skilled in the relevant art will appreciate that each of the first and sixth lenses may be configured in an opposite refractive power from the configuration described above. For example, in an alternative configuration, the first lens has a positive refractive power, the second lens has a positive refractive power, the third lens has a negative refractive power, the fourth lens has a negative refractive power, the fifth lens has a positive refractive power, and the sixth lens has a negative refractive power.

The optical system configured as described above improves optical performance through aberration improvement. In addition, the optical system is bright, and has a high resolution and a wide field of view.

The optical system, according to embodiments, satisfies Conditional Expression 1.

$$SD/f < 0.5 \qquad \text{[Conditional Expression 1]}$$

In this expression, SD is a diameter of the stop, and f is an overall focal length of the optical system.

The optical system, according to embodiments, satisfies Conditional Expression 2.

$$|v1-v2| < 10 \qquad \text{[Conditional Expression 2]}$$

In this example, v1 is the Abbe number of the first lens, and v2 is the Abbe number of the second lens.

The optical system, according to embodiments, satisfies Conditional Expression 3.

$$-0.5 < (r9-r10)/(r9+r10) < 0 \qquad \text{[Conditional Expression 3]}$$

In this expression, r9 is a radius of curvature of an object-side surface of the fifth lens, and r10 is a radius of curvature of an image-side surface of the fifth lens.

The optical system, according to embodiments, satisfies Conditional Expression 4.

$$TTL/f < 2.0 \qquad \text{[Conditional Expression 4]}$$

In this expression, TTL is a distance from an object-side surface of the first lens to an image surface of the image sensor, and f is the overall focal length of the optical system.

The optical system, according to embodiments, satisfies Conditional Expression 5.

$$0.01 < |f/f1| < 0.2 \qquad \text{[Conditional Expression 5]}$$

In this expression, f is the overall focal length of the optical system, and f1 is a focal length of the first lens.

The optical system, according to embodiments, satisfies Conditional Expression 6.

$$0.06 < f/f2 < 0.2 \qquad \text{[Conditional Expression 6]}$$

In this expression, f is the overall focal length of the optical system, and f2 is a focal length of the second lens.

The optical system, according to embodiments, satisfies Conditional Expression 7.

$$1.3 < f/f3 < 1.7 \qquad \text{[Conditional Expression 7]}$$

In this expression, f is the overall focal length of the optical system, and f3 is a focal length of the third lens.

The optical system, according to embodiments, satisfies Conditional Expression 8.

$$0.07 < |f/f4| < 0.2 \qquad \text{[Conditional Expression 8]}$$

In this example, f is the overall focal length of the optical system, and f4 is a focal length of the fourth lens.

The optical system, according to embodiments, satisfies Conditional Expression 9.

$$0.4 < |f/f5| < 0.7 \qquad \text{[Conditional Expression 9]}$$

In this example, f is the overall focal length of the optical system, and f5 is a focal length of the fifth lens.

The optical system, according to embodiments, satisfies Conditional Expression 10.

$$0.1 < f/f6 < 0.4 \qquad \text{[Conditional Expression 10]}$$

In this expression, f is the overall focal length of the optical system, and f6 is a focal length of the sixth lens.

The optical system, according to embodiments satisfies Conditional Expression 11.

$$1.5 < |f1/f2| < 5.5 \qquad \text{[Conditional Expression 11]}$$

In this expression, f1 is the focal length of the first lens, and f2 is the focal length of the second lens.

The optical system, according to embodiments, satisfies Conditional Expression 12.

$$2.0 < |f4/f5| < 8.0 \qquad \text{[Conditional Expression 12]}$$

In this expression, f4 is the focal length of the fourth lens, and f5 is the focal length of the fifth lens.

The optical system, according to embodiments, satisfies Conditional Expression 13.

$$v3-v1 > 30 \qquad \text{[Conditional Expression 13]}$$

In this expression, v1 is the Abbe number of the first lens, and v3 is the Abbe number of the third lens.

The optical system, according to embodiments, satisfies Conditional Expression 14.

$$FOV > 85 \qquad \text{[Conditional Expression 14]}$$

In this expression, FOV is a field of view of the optical system. Here, the field of view of the optical system is indicated in degrees.

Next, the first to sixth lenses configuring the optical system, according to various embodiments, will be described.

The first lens has a negative refractive power. In addition, the first lens has a meniscus shape of which an object-side surface is convex. For example, a first surface of the first lens is convex in a paraxial region, and a second surface of the first lens is concave in the paraxial region.

At least one of the first and second surfaces of the first lens is aspherical. For example, both surfaces of the first lens are aspherical. In another example, neither of the first and second surfaces are aspherical.

The second lens has a positive refractive power. In addition, the second lens has a meniscus shape of which an object-side surface is convex. For example, a first surface of the second lens is convex in the paraxial region, and a second surface of the second lens may be concave in the paraxial region.

At least one of the first and second surfaces of the second lens is aspherical. For example, both surfaces of the second lens may be aspherical.

The third lens has a positive refractive power. In addition, both surfaces of the third lens is convex. In detail, first and second surfaces of the third lens are convex in the paraxial region. In accordance with an alternative embodiment, the first surface of the third lens is substantially flat.

At least one of the first and second surfaces of the third lens is aspherical. For example, both surfaces of the third lens may be aspherical. In another example, neither surface of the third lens is aspherical.

The fourth lens has a negative refractive power. In addition, the fourth lens has a meniscus shape of which an image-side surface is convex. For instance, a first surface of the fourth lens may be concave in the paraxial region, and a second surface of the fourth lens is convex in the paraxial region.

At least one of the first and second surfaces of the fourth lens is aspherical. For example, both surfaces of the fourth lens are aspherical.

The fifth lens has a negative refractive power. In addition, the fifth lens has a meniscus shape of which an image-side surface is convex. In one example, a first surface of the fifth lens is concave in the paraxial region, and a second surface of the fifth lens is convex in the paraxial region. In another example, the first surface of the fifth lens is concave in the paraxial region, and a second surface of the fifth lens is substantially flat, except for the paraxial region in which the second surface is convex. In a further example, the first surface of the fifth lens is concave in the paraxial region, and the second surface of the fifth lens is substantially flat.

At least one of the first and second surfaces of the fifth lens is aspherical. For example, both surfaces of the fifth lens are aspherical.

The sixth lens has a positive refractive power. In addition, the sixth lens has a meniscus shape of which an object-side surface is convex. For instance, a first surface of the sixth lens is convex in the paraxial region, and a second surface of the sixth lens is concave in the paraxial region.

At least one of the first and second surfaces of the sixth lens is aspherical. For example, both surfaces of the sixth lens are aspherical.

In addition, the sixth lens has at least one inflection point formed on at least one of the first and second surfaces thereof. For example, the first surface of the sixth lens is convex in the paraxial region and becomes gradually concave towards an edge thereof. In addition, the second surface of the sixth lens is concave in the paraxial region and becomes gradually convex towards an edge thereof.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

In accordance with some of the many advantages of the optical system configured as described above, are high aberration improvement performance, high quality brightness, and a high resolution and a wide field of view because the plurality of lenses 110 through 160 perform an aberration correction function.

An optical system, according to a first embodiment, in the present disclosure will be described with reference to FIGS. 1 through 4.

The optical system, according to the first embodiment, includes a first lens 110, a second lens 120, a third lens 130, a fourth lens 140, a fifth lens 150, and a sixth lens 160. The optical system also includes a stop, an infrared cut-off filter 170, and an image sensor 180.

As illustrated in Table 1, a focal length (f1) of the first lens 110 is −96 mm, a focal length (f2) of the second lens 120 is 26.52 mm, a focal length (f3) of the third lens 130 is 1.45 mm, a focal length (f4) of the fourth lens 140 is −20.21 mm, a focal length (f5) of the fifth lens 150 is −4.34 mm, a focal length (f6) of the sixth lens 160 may be 8.57 mm, and an overall focal length (f) of the optical system is 2.2 mm.

TABLE 1

|  | Example 1 |
| --- | --- |
| fno | 2.2 |
| FOV | 86 |
| TTL | 4.06 |
| f | 2.2 |
| f1 | −96 |
| f2 | 26.52 |
| f3 | 1.45 |
| f4 | −20.21 |
| f5 | −4.34 |
| f6 | 8.57 |
| Stop/f | 0.41 |
| TTL/f | 1.84 |
| (r9 − r10)/(r9 + r10) | −0.28 |

In this example, respective characteristics, such as radii of curvature, thicknesses, refractive indices, and Abbe numbers, of lenses are illustrated in FIG. 3.

In the first embodiment, the first lens 110 has a negative refractive power, and has a meniscus shape of which an object-side surface is convex. For example, a first surface of the first lens 110 is convex in the paraxial region, and a second surface of the first lens 110 is concave in the paraxial region. For example, a first surface of the first lens 110 is convex in the paraxial region, and a second surface of the first lens 110 is concave in the paraxial region.

The second lens 120 has a positive refractive power, and has a meniscus shape of which an object-side surface is convex. For example, a first surface of the second lens 120 is convex in the paraxial region, and a second surface of the second lens 120 is concave in the paraxial region.

The third lens 130 has a positive refractive power, and both surfaces thereof are convex. For example, first and second surfaces of the third lens 130 are convex in the paraxial region. For example, a first surface of the third lens 130 is convex in the paraxial region, and a second surface of the third lens 130 is concave in the paraxial region.

The fourth lens 140 has a negative refractive power and has a meniscus shape of which an image-side surface is convex. For example, a first surface of the fourth lens 140 is concave in the paraxial region, and a second surface of the fourth lens 140 is convex in the paraxial region.

The fifth lens 150 has a negative refractive power, and has a meniscus shape of which an image-side surface is convex. For example, a first surface of the fifth lens 150 is concave in the paraxial region, and a second surface of the fifth lens 150 is convex in the paraxial region.

The sixth lens 160 has a positive refractive power, and has a meniscus shape of which an object-side surface is convex. For example, a first surface of the sixth lens 160 is convex in the paraxial region, and a second surface of the sixth lens 160 is concave in the paraxial region.

In addition, the sixth lens 160 has at least one inflection point formed on at least one of the first and second surfaces thereof.

Further, the respective surfaces of the first to sixth lenses 110 to 160 has aspherical surface coefficients as illustrated in FIG. 4. That is, each of the first surface of the first lens 110 to the second surface of the sixth lens 160 is aspherical. However, persons skilled in the art will appreciate that some variation in the aspherical surface coefficients may exist without departing from the results and benefits of the present third embodiment.

In one example, the stop is positioned between the first lens 110 and the second lens 120. However, the stop is not limited to being positioned between these two lenses 110 and 120 and may be positioned between the image-side or the object-side of the first lens 110 and another side of the lenses in the optical system.

Figure 2:
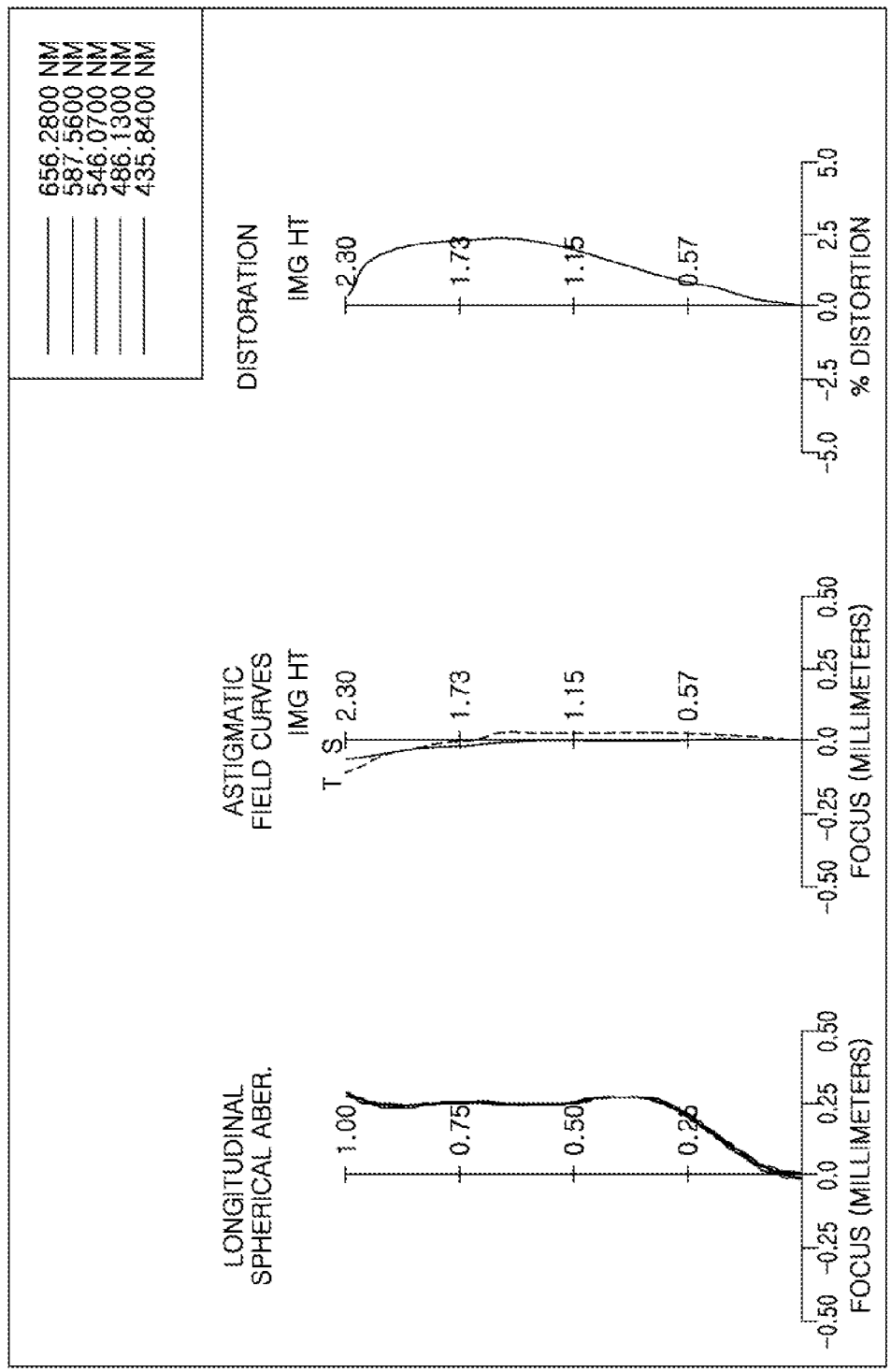
FIG. 2 is a graph including curves representing aberration characteristics of the optical system illustrated in FIG. 1.
Figure 5:
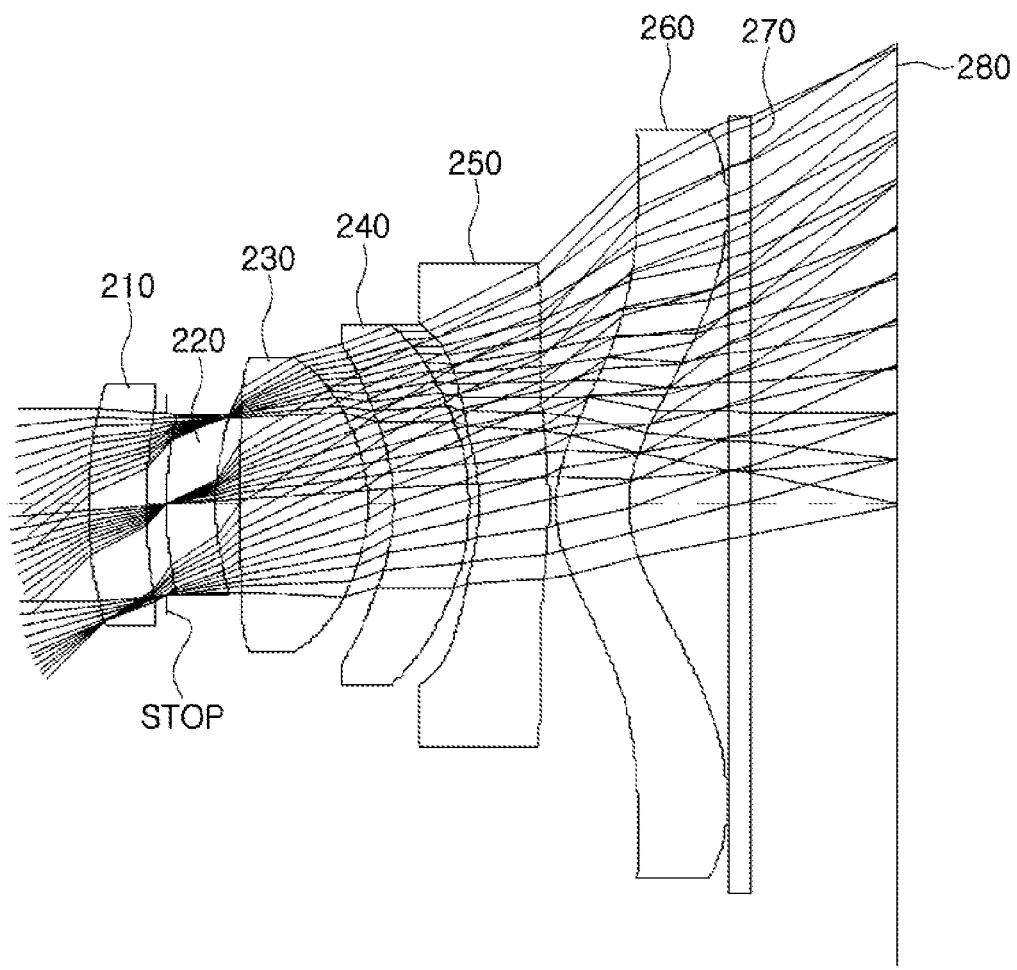
FIG. 5 is a view of an optical system, according to a second embodiment.

In addition, the optical system configured as described above includes aberration characteristics as illustrated in FIG. 2. However, persons skilled in the art will appreciate that some variation in the aberration characteristics may exist without departing from the results and benefits of the first embodiment.

An optical system, according to a second embodiment, will be described with reference to FIGS. 5 through 8.

The optical system, according to the second embodiment, includes a first lens 210, a second lens 220, a third lens 230, a fourth lens 240, a fifth lens 250, and a sixth lens 260. The optical system also includes a stop, an infrared cut-off filter 270, and an image sensor 280.

As illustrated in Table 2, a focal length (f1) of the first lens 210 is −24.22 mm, a focal length (f2) of the second lens 220 is 13.7 mm, a focal length (f3) of the third lens 230 is 1.47 mm, a focal length (f4) of the fourth lens 240 is −28.74 mm, a focal length (f5) of the fifth lens 250 is −4.05 mm, a focal length (f6) of the sixth lens 260 is 8.16 mm, and an overall focal length (f) of the optical system is 2.2 mm.

TABLE 2

|  | Example 2 |
|---|---|
| fno | 2.28 |
| FOV | 88 |
| TTL | 4.05 |
| f | 2.2 |
| f1 | −24.22 |
| f2 | 13.7 |
| f3 | 1.47 |
| f4 | −28.74 |
| f5 | −4.05 |
| f6 | 8.16 |
| Stop/f | 0.41 |
| TTL/f | 1.84 |
| (r9 − r10)/(r9 + r10) | −0.3 |

In this example, respective characteristics, such as radii of curvature, thicknesses, refractive indices, and Abbe numbers, of lenses are illustrated in FIG. 7.

In the second embodiment, the first lens 210 may have negative refractive power, and has a meniscus shape of which an object-side surface is convex. For example, a first surface of the first lens 210 is convex in the paraxial region, and a second surface of the first lens 210 may be concave in the paraxial region.

The second lens 220 has a positive refractive power, and has a meniscus shape of which an object-side surface is convex. For example, a first surface of the second lens 220 is convex in the paraxial region, and a second surface of the second lens 220 is concave in the paraxial region.

The third lens 230 has a positive refractive power, and both surfaces thereof are convex. For example, first and second surfaces of the third lens 230 are convex in the paraxial region.

The fourth lens 240 has a negative refractive power, and has a meniscus shape of which an image-side surface is convex. For example, a first surface of the fourth lens 240 is concave in the paraxial region, and a second surface of the fourth lens 240 is convex in the paraxial region.

The fifth lens 250 has a negative refractive power, and has a meniscus shape of which an image-side surface is convex. For example, a first surface of the fifth lens 250 is concave in the paraxial region, and a second surface of the fifth lens 250 is convex in the paraxial region.

The sixth lens 260 has positive refractive power, and has a meniscus shape of which an object-side surface is convex. For example, a first surface of the sixth lens 260 is convex in the paraxial region, and a second surface of the sixth lens 260 is concave in the paraxial region.

In addition, the sixth lens 260 has at least one inflection point formed on at least one of the first and second surfaces thereof.

Furthermore, the respective surfaces of the first to sixth lenses 210 to 260 have aspherical surface coefficients as illustrated in FIG. 8.

In addition, the stop is disposed between the first lens 210 and the second lens 220.

Figure 6:
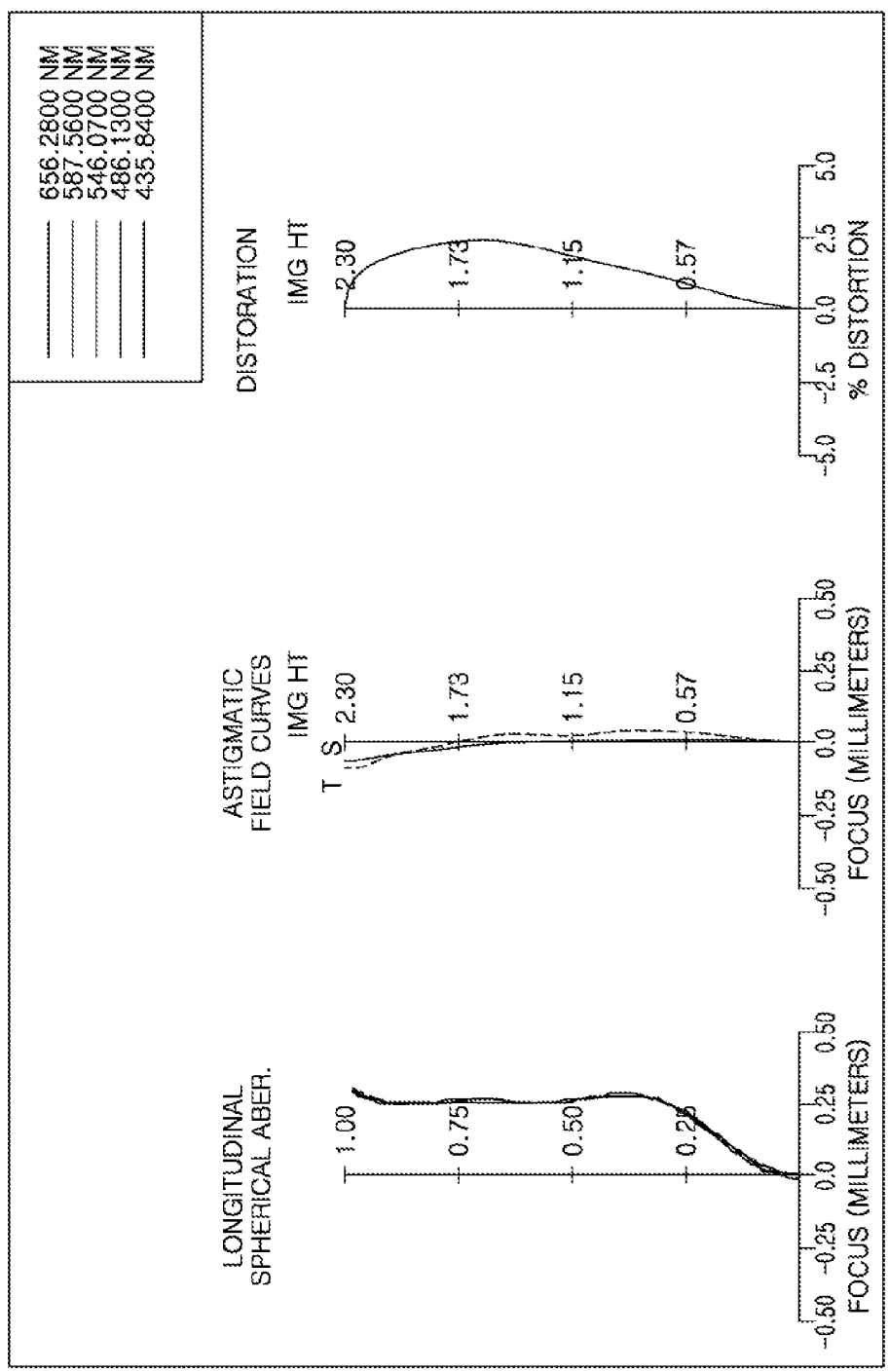
FIG. 6 is a graph including curves representing aberration characteristics of the optical system illustrated in FIG. 5.
Figure 9:
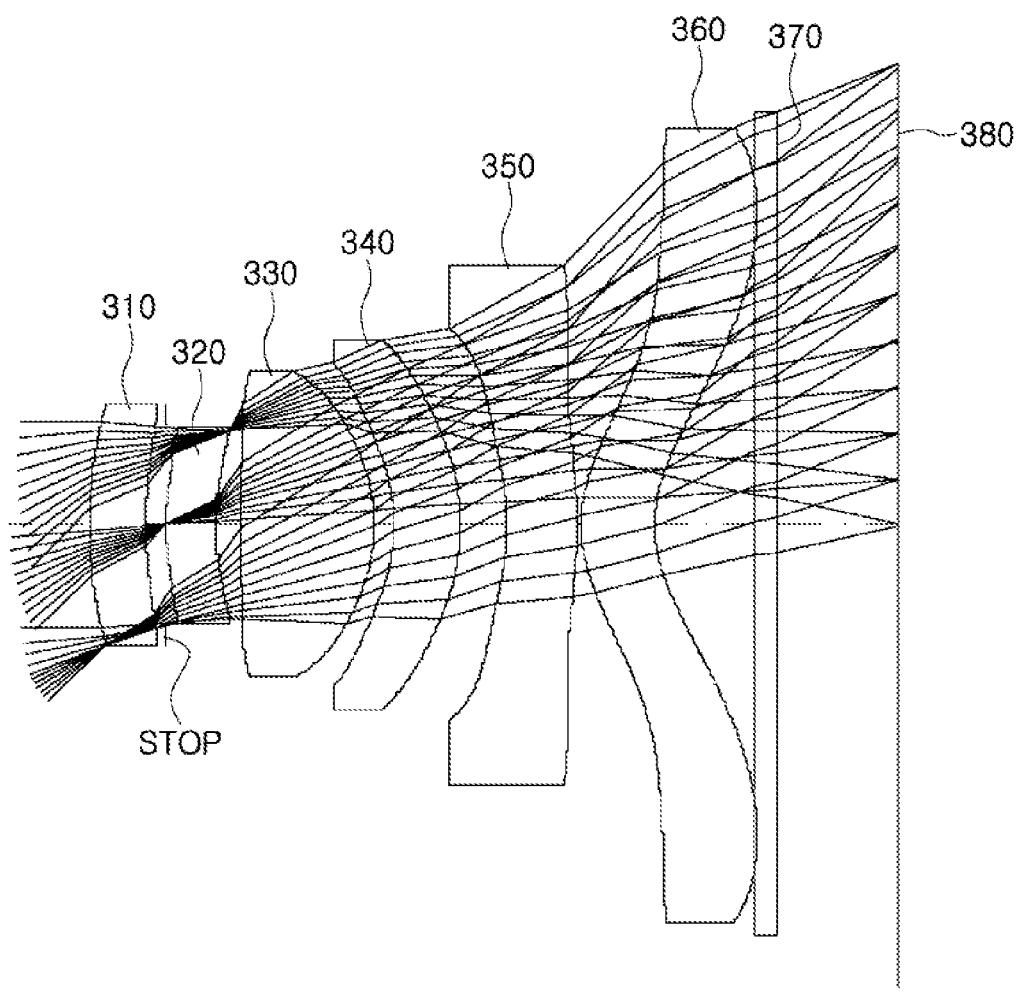
FIG. 9 is a view of an optical system, according to a third embodiment.

In addition, the optical system configured as described above has aberration characteristics as illustrated in FIG. 6. However, persons skilled in the art will appreciate that some variation in the aberration characteristics may exist without departing from the results and benefits of the second embodiment.

An optical system, according to a third embodiment, will be described with reference to FIGS. 9 through 12.

The optical system, according to the third embodiment, includes a first lens 310, a second lens 320, a third lens 330, a fourth lens 340, a fifth lens 350, and a sixth lens 360, and may further include a stop, an infrared cut-off filter 370, and an image sensor 380.

As illustrated in Table 3, a focal length (f1) of the first lens 310 is −17.89 mm, a focal length (f2) of the second lens 320 is 11.64 mm, a focal length (f3) of the third lens 330 is 1.46 mm, a focal length (f4) of the fourth lens 340 is −16.23 mm, a focal length (f5) of the fifth lens 350 is −4.3 mm, a focal length (f6) of the sixth lens 360 is 8.8 mm, and an overall focal length (f) of the optical system is 2.2 mm.

TABLE 3

|  | Example 3 |
|---|---|
| fno | 2.12 |
| FOV | 90 |
| TTL | 4.05 |
| f | 2.2 |
| f1 | −17.89 |
| f2 | 11.64 |
| f3 | 1.46 |
| f4 | −16.23 |
| f5 | −4.3 |
| f6 | 8.8 |
| Stop/f | 0.44 |
| TTL/f | 1.84 |
| (r9 − r10)/(r9 + r10) | −0.3 |

In this example, respective characteristics, such as radii of curvature, thicknesses, refractive indices, and Abbe numbers, of lenses are illustrated in FIG. 11.

In the third embodiment, the first lens 310 has a negative refractive power, and has a meniscus shape of which an image-side surface is convex. For example, a first surface of the first lens 310 is convex in the paraxial region, and a second surface of the first lens 310 is concave in the paraxial region.

The second lens 320 has a positive refractive power, and has a meniscus shape of which an object-side surface is convex. For example, a first surface of the second lens 320 is convex in the paraxial region, and a second surface of the second lens 320 is concave in the paraxial region.

The third lens 330 has a positive refractive power, and both surfaces thereof are convex. For example, first and second surfaces of the third lens 330 is convex in the paraxial region.

The fourth lens 340 has a negative refractive power, and has a meniscus shape of which an image-side surface is convex. For example, a first surface of the fourth lens 340 is concave in the paraxial region, and a second surface of the fourth lens 340 is convex in the paraxial region.

The fifth lens 350 has a negative refractive power, and has a meniscus shape of which an image-side surface is convex. For example, a first surface of the fifth lens 350 is concave in the paraxial region, and a second surface of the fifth lens 350 is convex in the paraxial region.

The sixth lens 360 has a positive refractive power, and has a meniscus shape of which an object-side surface is convex. For example, a first surface of the sixth lens 360 is convex in the paraxial region, and a second surface of the sixth lens 360 is concave in the paraxial region.

In addition, the sixth lens 360 has at least one inflection point formed on at least one of the first and second surfaces thereof.

Furthermore, the respective surfaces of the first to sixth lenses 310 to 360 has aspherical surface coefficients as illustrated in FIG. 12. However, persons skilled in the art will appreciate that some variation in the aspherical surface coefficients may exist without departing from the results and benefits of the third embodiment.

In addition, the stop is disposed between the first lens 310 and the second lens 320.

Figure 10:
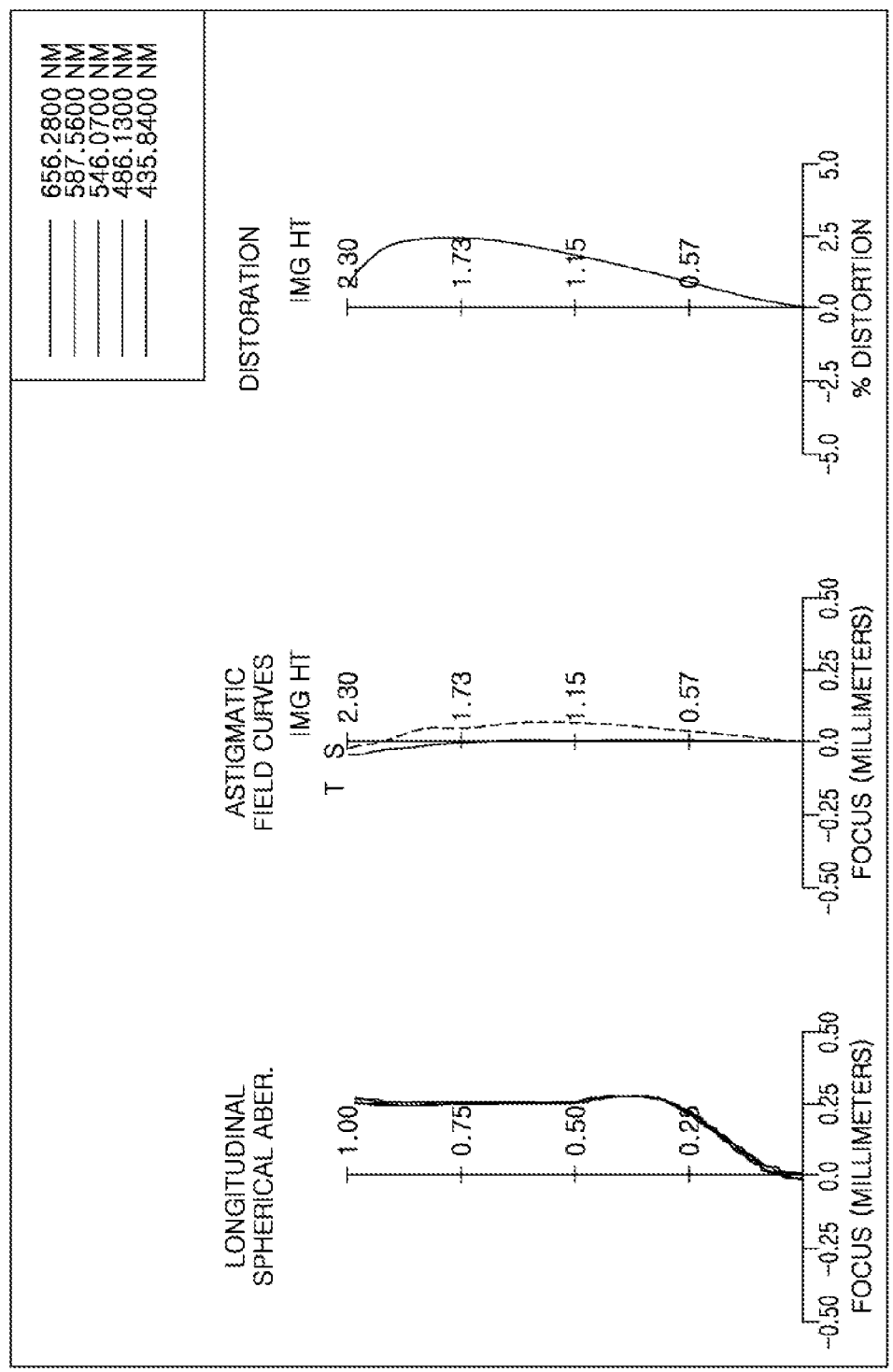
FIG. 10 is a graph including curves representing aberration characteristics of the optical system illustrated in FIG. 9.
Figure 13:
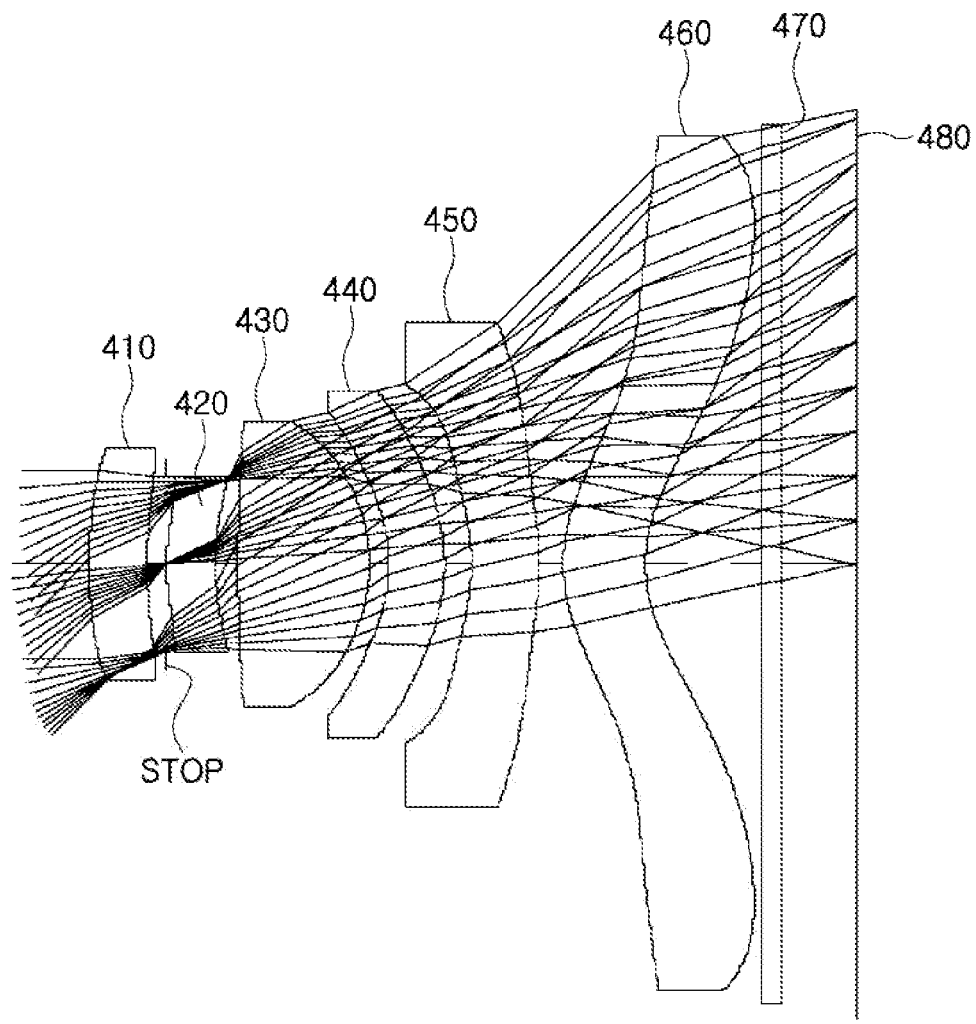
FIG. 13 is a view of an optical system, according to a fourth embodiment.

In addition, the optical system configured as described above has aberration characteristics as illustrated in FIG. 10. However, persons skilled in the art will appreciate that some variation in the aberration characteristics may exist without departing from the results and benefits of the third embodiment.

An optical system, according to a fourth embodiment, will be described with reference to FIGS. 13 through 16.

The optical system, according to the fourth embodiment, includes a first lens 410, a second lens 420, a third lens 430, a fourth lens 440, a fifth lens 450, and a sixth lens 460. The optical system also includes a stop, an infrared cut-off filter 470, and an image sensor 480.

As illustrated in Table 4, a focal length (f1) of the first lens 410 is −169 mm, a focal length (f2) of the second lens 420 is 32.21 mm, a focal length (f3) of the third lens 430 is 1.4 mm, a focal length (f4) of the fourth lens 440 is −11.47 mm, a focal length (f5) of the fifth lens 450 is −5.06 mm, a focal length (f6) of the sixth lens 460 is 11.9 mm, and an overall focal length (f) of the optical system is 2.2 mm.

TABLE 4

|  | Example 4 |
|---|---|
| fno | 2.28 |
| FOV | 90 |
| TTL | 3.97 |
| f | 2.2 |
| f1 | −169 |
| f2 | 32.21 |
| f3 | 1.4 |
| f4 | −11.47 |
| f5 | −5.06 |
| f6 | 11.9 |
| Stop/f | 0.41 |
| TTL/f | 1.81 |
| (r9 − r10)/(r9 + r10) | −0.24 |

In this example, respective characteristics, such as radii of curvature, thicknesses, refractive indices, and Abbe numbers, of lenses are illustrated in FIG. 15.

In the fourth embodiment, the first lens 410 has a negative refractive power, and has a meniscus shape of which an object-side surface is convex. For example, a first surface of the first lens 410 is convex in the paraxial region, and a second surface of the first lens 410 is concave in the paraxial region.

The second lens 420 has a positive refractive power, and has a meniscus shape of which an object-side surface is convex. For example, a first surface of the second lens 420 is convex in the paraxial region, and a second surface of the second lens 420 is concave in the paraxial region.

The third lens 430 has a positive refractive power, and both surfaces thereof is convex. For example, first and second surfaces of the third lens 430 is convex in the paraxial region.

The fourth lens 440 has a negative refractive power, and has a meniscus shape of which an image-side surface is convex. For example, a first surface of the fourth lens 440 is concave in the paraxial region, and a second surface of the fourth lens 440 is convex in the paraxial region.

The fifth lens 450 has a negative refractive power, and has a meniscus shape of which an image-side surface is convex. For example, a first surface of the fifth lens 450 is concave in the paraxial region, and a second surface of the fifth lens 450 is convex in the paraxial region.

The sixth lens 460 has a positive refractive power, and has a meniscus shape of which an object-side surface is convex. For example, a first surface of the sixth lens 460 is convex in the paraxial region, and a second surface of the sixth lens 460 is concave in the paraxial region.

In addition, the sixth lens 460 has at least one inflection point formed on at least one of the first and second surfaces thereof.

Meanwhile, the respective surfaces of the first to sixth lenses 410 to 460 may have aspherical surface coefficients as illustrated in FIG. 16. However, persons skilled in the art will appreciate that some variation in the aberration surface coefficients may exist without departing from the results and benefits of the fourth embodiment.

In addition, the stop is disposed between the first lens 410 and the second lens 420.

Figure 14:
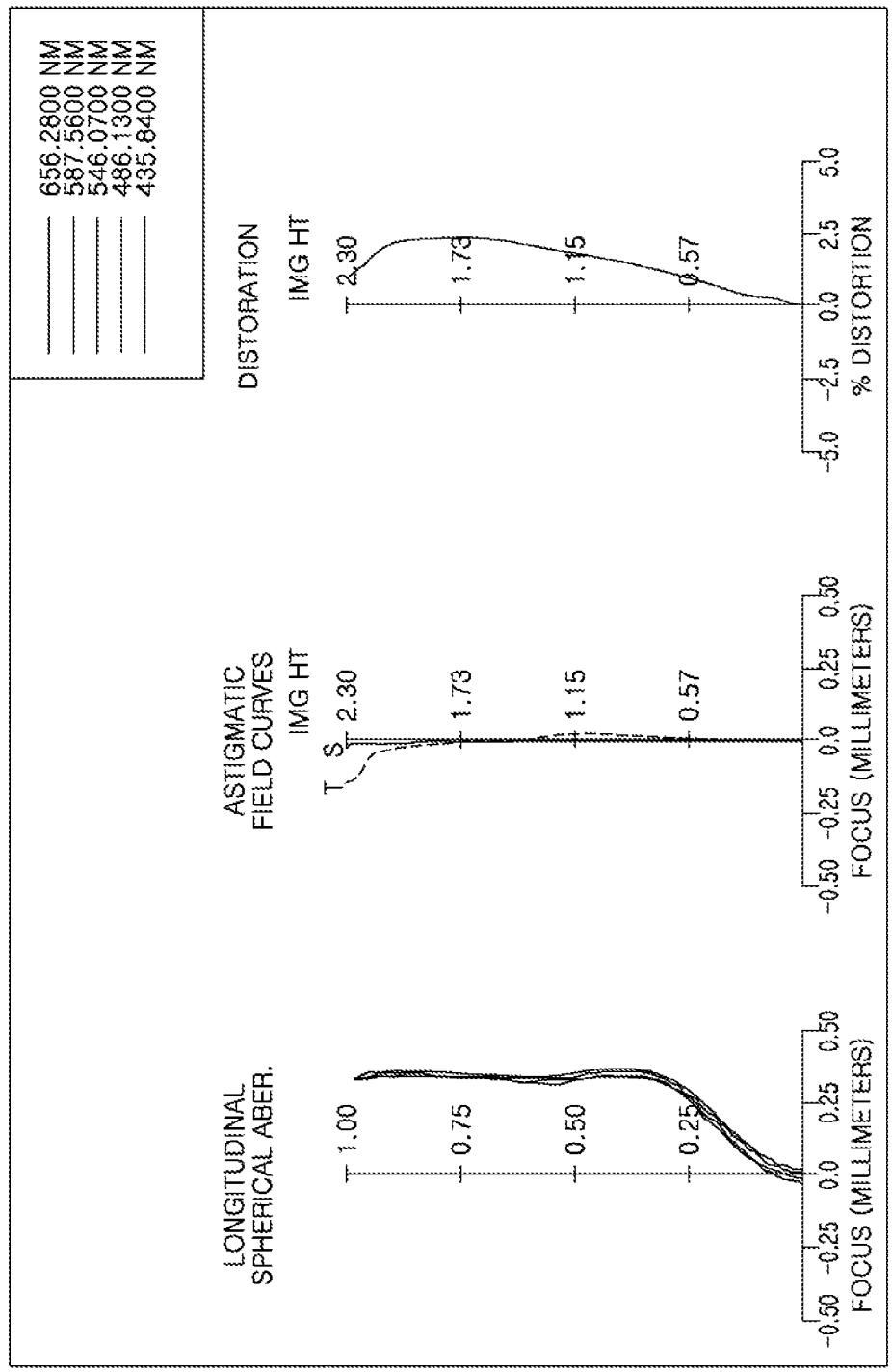
FIG. 14 is a graph including curves representing aberration characteristics of the optical system illustrated in FIG. 13.

In addition, the optical system configured as described above may have aberration characteristics as illustrated in FIG. 14. However, persons skilled in the art will appreciate that some variation in the aberration characteristics may exist without departing from the results and benefits of the fourth embodiment.

As set forth above, according to various embodiments, the optical system having an increased aberration improvement effect, being bright, and having high resolution and a wide field of view is provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
a first lens comprising a negative refractive power;
a second lens comprising a positive refractive power;
a third lens comprising a positive refractive power;
a fourth lens comprising a negative refractive power, wherein an image-side surface of the fourth lens is convex in a paraxial region;
a fifth lens comprising a negative refractive power, wherein an image-side surface of the fifth lens is convex in the paraxial region; and
a sixth lens comprising a positive refractive power, wherein an image-side surface of the sixth lens is concave in the paraxial region,
wherein the first to sixth lenses are sequentially disposed from an object side to an image side, and
wherein, FOV, a field of view of the optical system satisfies FOV>85°.

2. The optical system of claim 1, further comprising:
a stop disposed between the first and second lenses, wherein, SD, a diameter of the stop and, f, an overall focal length of the optical system including the first to sixth lenses satisfy SD/f<0.5.

3. The optical system of claim 1, wherein, v1, an Abbe number of the first lens and, v2, an Abbe number of the second lens satisfy |v1−v2|<10.

4. The optical system of claim 1, wherein, r9, a radius of curvature of an object-side surface of the fifth lens and, r10, a radius of curvature of the image-side surface of the fifth lens satisfy −0.5<(r9−r10)/(r9+r10)<0.

5. The optical system of claim 1, further comprising:
an image sensor configured to convert an image of a subject incident through the first through sixth lenses into electrical signals,
wherein TTL is a distance from an object-side surface of the first lens to an image surface of the image sensor and f is an overall focal length of the optical system including the first to sixth lenses satisfying TTL/f<2.0.

6. The optical system of claim 1, wherein, f, an overall focal length of the optical system including the first to sixth lenses and, f1, a focal length of the first lens satisfy 0.01<|f/f1|<0.2.

7. The optical system of claim 1, wherein, f, an overall focal length of the optical system including the first to sixth lenses and, f2, a focal length of the second lens satisfy 0.06<f/f2<0.2.

8. The optical system of claim 1, wherein, f, an overall focal length of the optical system including the first to sixth lenses and, f3, a focal length of the third lens satisfy 1.3<f/f3<1.7.

9. The optical system of claim 1, wherein, f, an overall focal length of the optical system including the first to sixth lenses and, f4, a focal length of the fourth lens satisfy 0.07<|f/f4|<0.2.

10. The optical system of claim 1, wherein, f, an overall focal length of the optical system including the first to sixth lenses and, f5, a focal length of the fifth lens satisfy 0.4<|f/f5|<0.7.

11. The optical system of claim 1, wherein, f, an overall focal length of the optical system including the first to sixth lenses and, f6, a focal length of the sixth lens satisfy 0.1<f/f6<0.4.

12. The optical system of claim 1, wherein, f1, a focal length of the first lens and, f2, a focal length of the second lens satisfy 1.5<|f1/f2|<5.5.

13. The optical system of claim 1, wherein, f4, a focal length of the fourth lens and, f5, a focal length of the fifth lens satisfy 2.0<f4/f5<8.0.

14. The optical system of claim 1, wherein, v1, an Abbe number of the first lens and, v3, an Abbe number of the third lens satisfy v3−v1>30.

15. The optical system of claim 1, wherein at least one inflection point is formed on at least one of the first and second surfaces of the sixth lens, where the first surface of the sixth lens is convex in the paraxial region and becomes gradually concave towards an edge thereof, and the second surface of the sixth lens is concave in the paraxial region and becomes gradually convex towards an edge thereof.

16. An optical system, comprising:
a first lens comprising a negative refractive power;
a second lens comprising a positive refractive power;
a third lens comprising a positive refractive power;
a fourth lens comprising a negative refractive power;
a fifth lens comprising a negative refractive power and an image-side surface that is convex in a paraxial region; and
a sixth lens comprising a positive refractive power and an image-side surface that is concave in the paraxial region,
wherein the first to sixth lenses are sequentially disposed from an object side to an image side, and
wherein, FOV, a field of view of the optical system satisfies FOV>85°.

* * * * *